Figure 3:
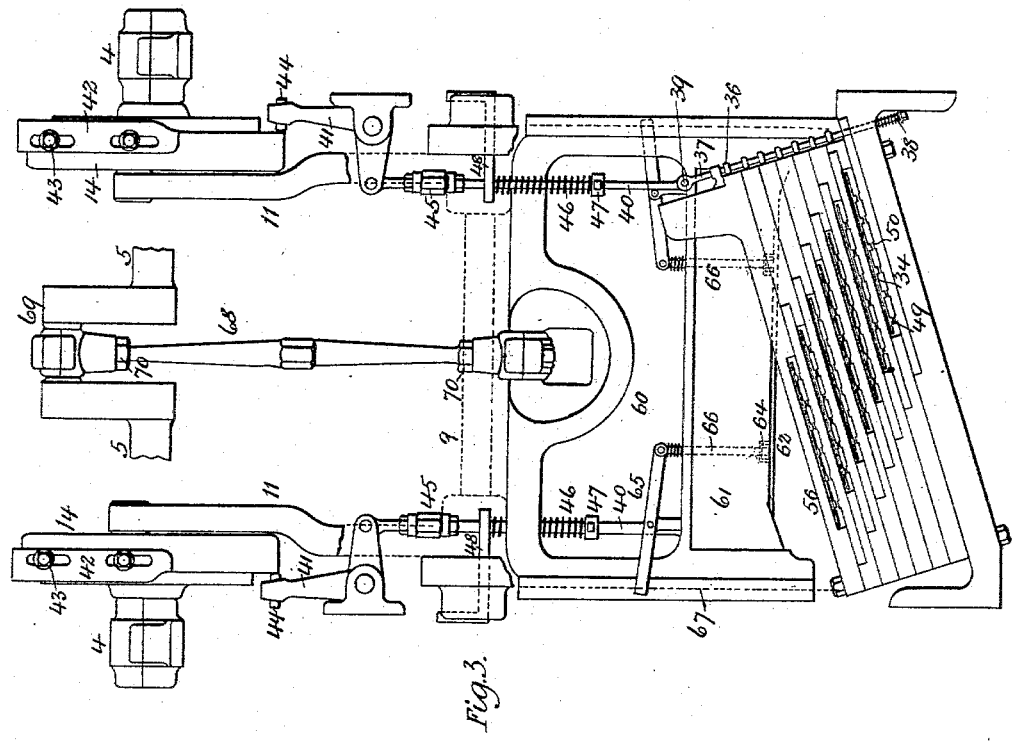

(No Model.) 7 Sheets—Sheet 1.
H. F. SMITH.
MACHINE FOR MAKING CELL CASES.
No. 551,338. Patented Dec. 10, 1895.
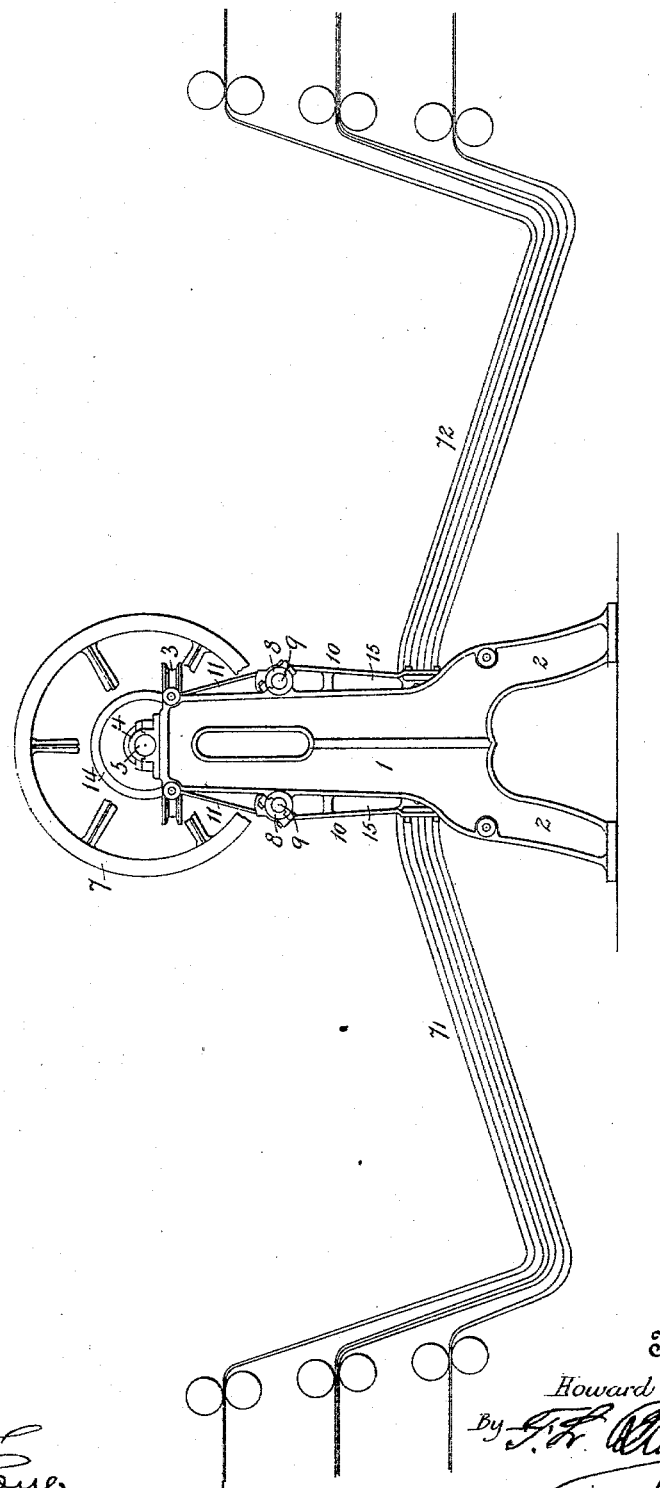

(No Model.) 7 Sheets—Sheet 2.

H. F. SMITH.
MACHINE FOR MAKING CELL CASES.

No. 551,338. Patented Dec. 10, 1895.

Witnesses
W. T. Norton
J. Mark Cowles

Inventor
Howard F. Smith
By F. F. Russell
his Attorney (No Model.) 7 Sheets—Sheet 3.
H. F. SMITH.
MACHINE FOR MAKING CELL CASES.
No. 551,338. Patented Dec. 10, 1895.
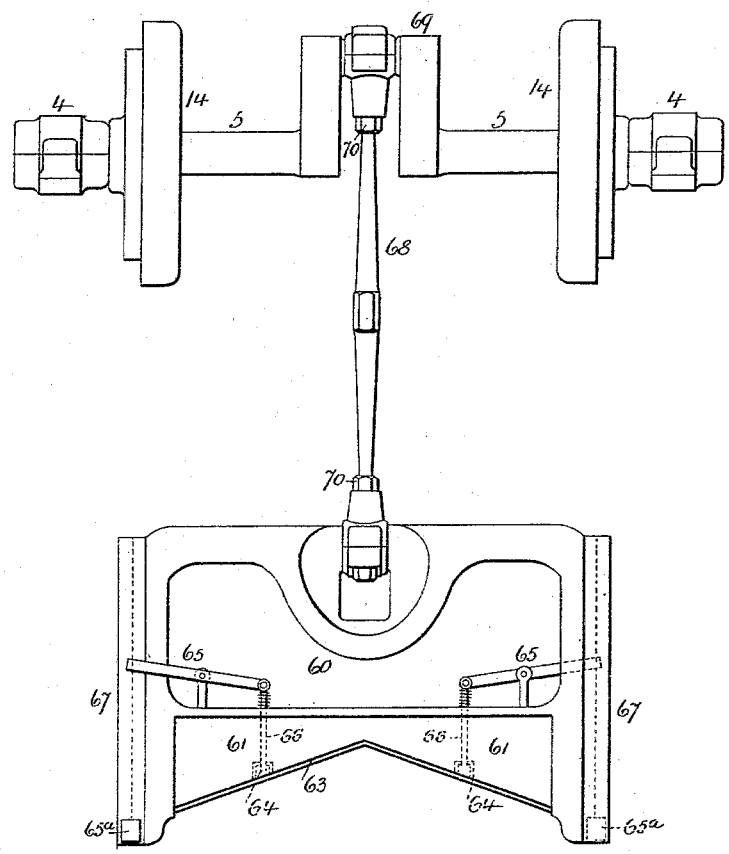
Fig. 3ª
Witnesses
W. J. Norton
Ben T. Webster
Inventor
Howard F. Smith
By T. F. Browne
his Attorney (No Model.) H. F. SMITH. 7 Sheets—Sheet 4.
MACHINE FOR MAKING CELL CASES.
No. 551,338. Patented Dec. 10, 1895.
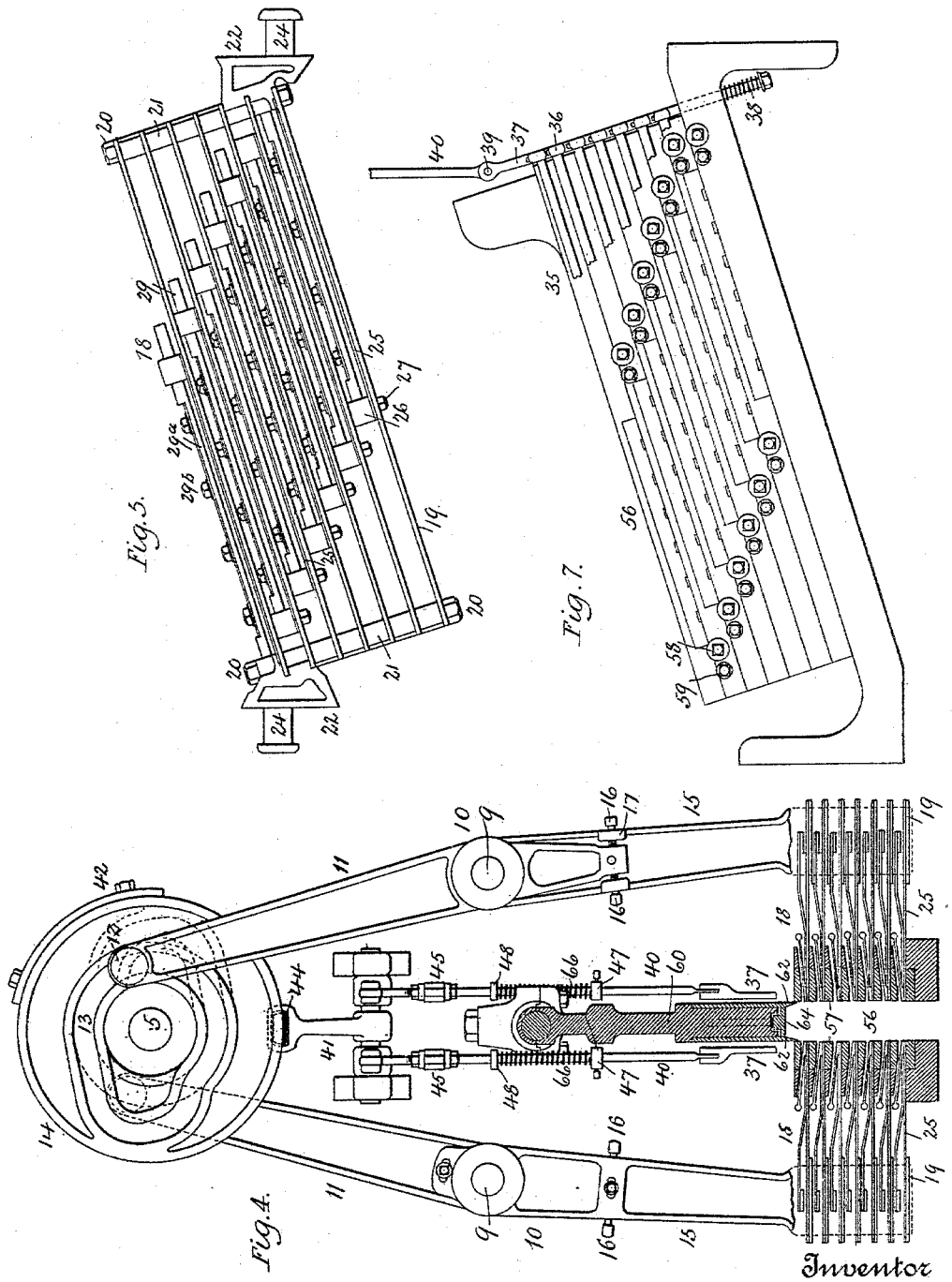
Witnesses
W. T. Norton
[signature]
Inventor
Howard F. Smith
By F. F. Greene
his Attorney (No Model.) 7 Sheets—Sheet 5.
H. F. SMITH.
MACHINE FOR MAKING CELL CASES.
No. 551,338. Patented Dec. 10, 1895.
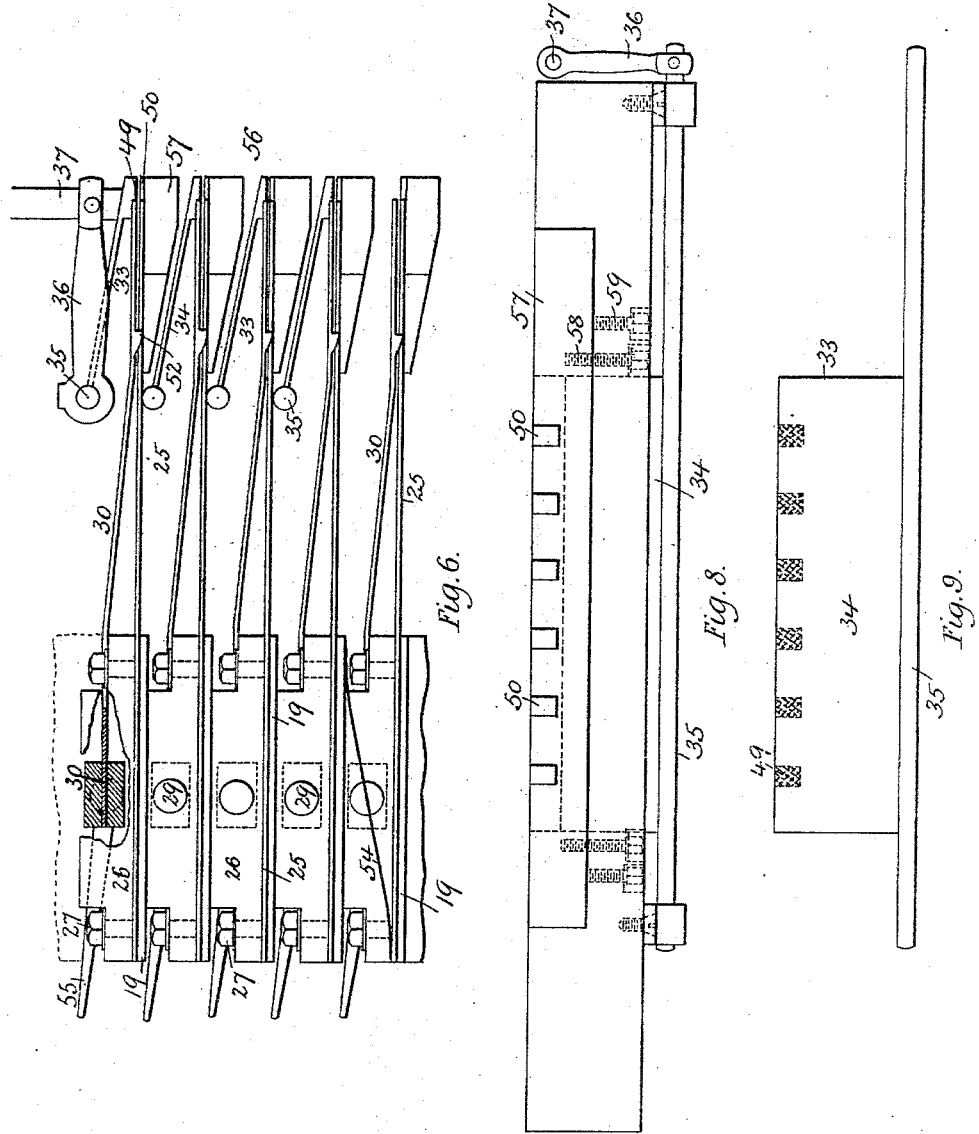
Witnesses
W. T. Norton
Martha Cullen
Inventor
Howard F. Smith
By T. H. Browne
his Attorney.

(No Model.)

7 Sheets—Sheet 6.

H. F. SMITH.
MACHINE FOR MAKING CELL CASES.

No. 551,338.

Patented Dec. 10, 1895.

Witnesses

Inventor
Howard F. Smith
By his Attorney.

(No Model.) 7 Sheets—Sheet 7.
H. F. SMITH.
MACHINE FOR MAKING CELL CASES.

No. 551,338. Patented Dec. 10, 1895.

Witnesses
W. T. Norton
Jonathan Cecil

Inventor
Howard F. Smith
By T. H. Browne
his Attorney.

UNITED STATES PATENT OFFICE.

HOWARD F. SMITH, OF ELKHART, INDIANA.

MACHINE FOR MAKING CELL-CASES.

SPECIFICATION forming part of Letters Patent No. 551,338, dated December 10, 1895.

Application filed October 10, 1894. Serial No. 525,461. (No model.)

*To all whom it may concern:*

Be it known that I, HOWARD F. SMITH, a citizen of the United States, residing at Elkhart, in the county of Elkhart and State of Indiana, have invented certain new and useful Improvements in Machines for Making Cell-Cases; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for manufacturing cell-cases for the packing and transportation of eggs and other articles, and has for its object the production of a machine of this character which is of comparatively simple construction but thoroughly effective and reliable in operation, and by which the maximum capacity is obtained.

My improved machine by its operation contemplates the presentation and assembling of strips of strawboard or other suitable material, which have been previously provided with interlocking perforations and tongues in a manner to form completed cell-cases, but in a collapsed or partially-collapsed condition, it being essential to the proper assembling of such strips that they be relatively inclined, or in other words that each strip of a set—as, for instance, the longitudinal set—be in advance of the next adjacent strip and arranged at an angle, and that the strips of the traverse set be similarly arranged but inclined or arranged at an angle opposite to that of the longitudinal strips.

In the operation of the machine the strips are formed all simultaneously, as will be explained, from sheets which are in number equal to the number of strips employed to form a cell-case, usually fourteen in number, thereby providing compartments in each case for thirty-six articles held singly. The sheets are divided into two series and fed to the machine, one series at each end thereof, said sheets having been previously passed through suitable punching-machines which operate to form in said sheets the interlocking tongues and perforations necessary to maintain the relative positions of the strips when the cell-case is open and ready for use, it being explained hereinafter that I employ interlocking perforations of such a character as that the strips can be assembled only when they are relatively inclined or in what I may term a "knockdown" condition. The sheets after receiving the interlocking perforations and tongues are passed between rollers and are allowed a "slack" before entering the machine. In the machine the strips are automatically arranged in their proper positions and relation, and the ends of the two series of sheets are assembled to the depth of a cell-case and the assembled ends are then severed, and a completed but collapsed or partially-collapsed cell-case is the result.

I will now describe in detail the construction of my improved cell-case machine and the operation of its parts, and in connection with this detailed description attention is directed to the accompanying drawings, which form a part of this specification, and in which—

Figure 2:
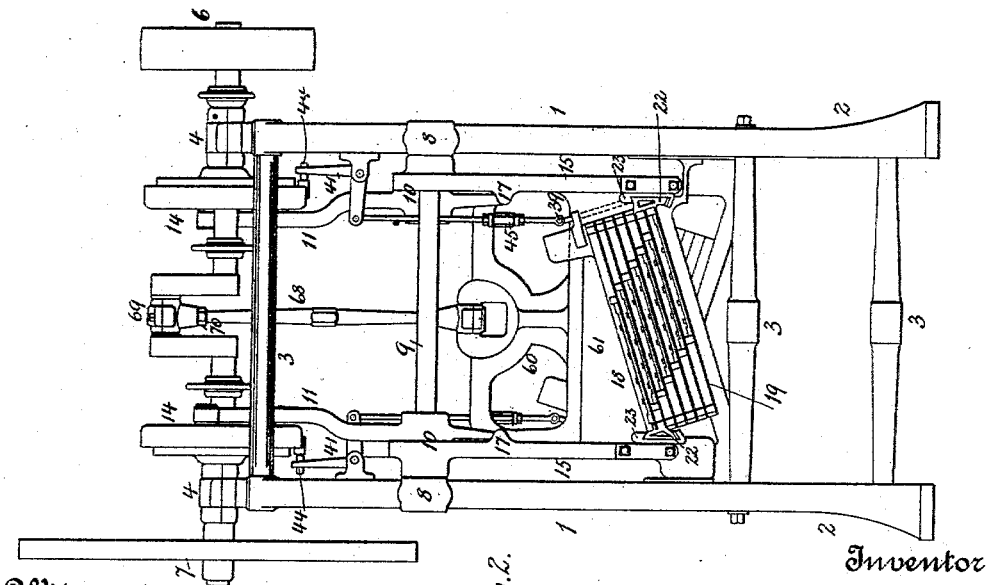
Figure 10:
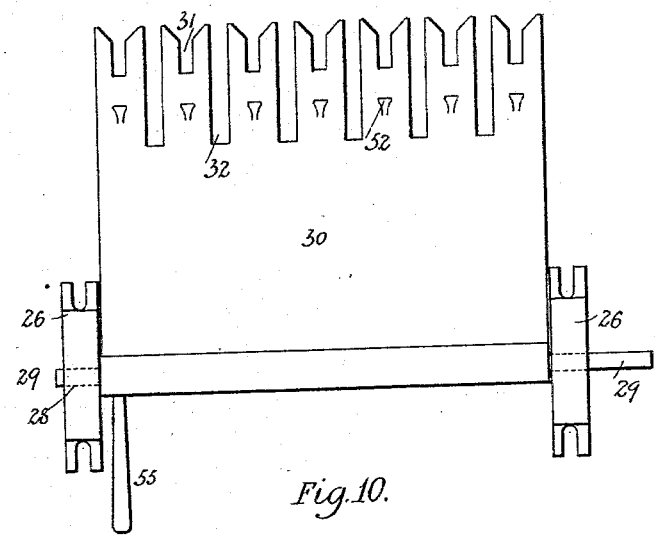
Figure 11:
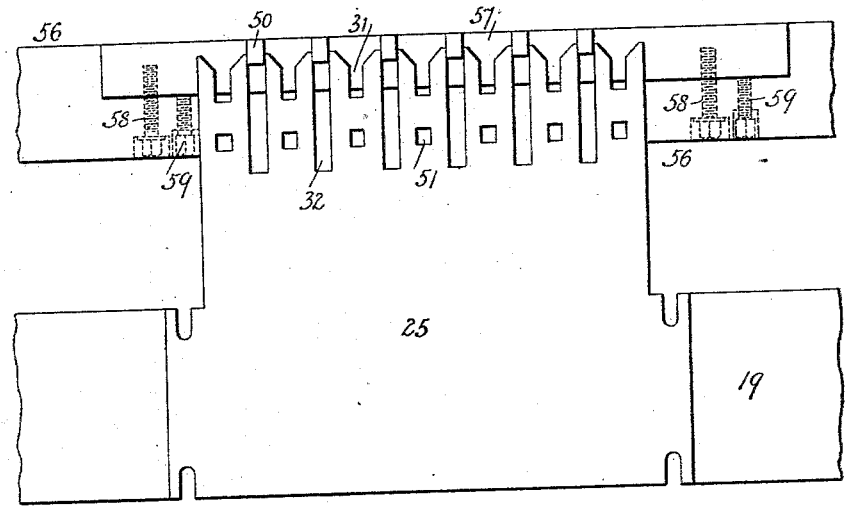
Figure 13:
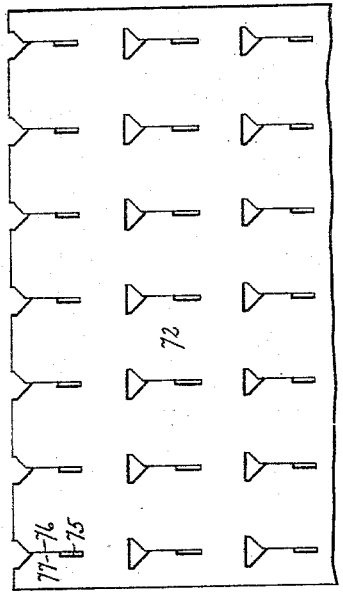
Figure 14:
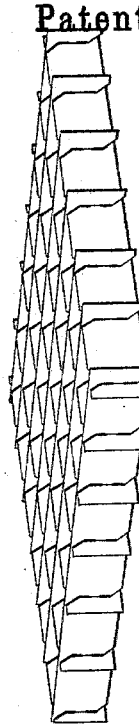
Figure 12:
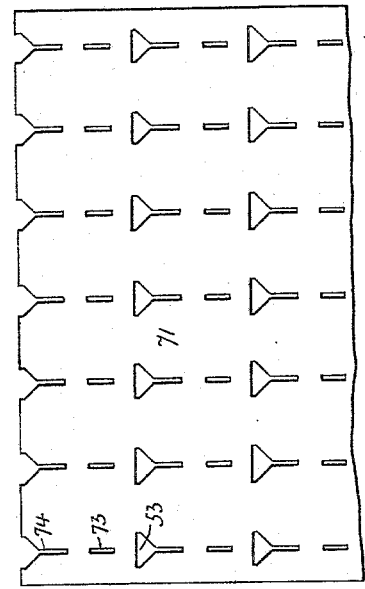
Figure 15:
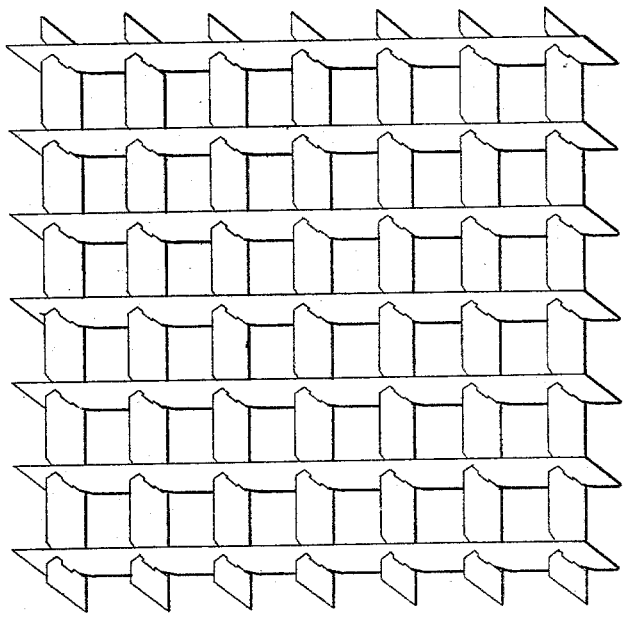

Figure 1 is a side elevation of my improved cell-case machine. Fig. 2 is a front elevation thereof. Fig. 3 is an enlarged front elevation of the machine, the frame and feed-carriage being omitted. Fig. 3ª is an enlarged front elevation of a portion of the machine, showing a modified form of knife and stripper and the stripper-actuating mechanism. Fig. 4 is a side elevation of the same, partly in section. Fig. 5 is an enlarged detail view of the carriage for feeding the sheets; Fig. 6, an enlarged side elevation of the same, partly in section, showing also the space-blocks in relative arrangement. Fig. 7 is an enlarged elevation of the spacing-blocks; Fig. 8, a detail enlarged of one of the space-blocks; Fig. 9, a detail enlarged of one of the grippers for holding the sheets during the return stroke of the machine. Fig. 10 is a detail enlarged of one of the upper plates; Fig. 11, a detail enlarged of one of the lower plates and space-blocks. Figs. 12 and 13 are enlarged plan views, respectively, of portions of the sheets from which are severed the longitudinal and transverse strips. Fig. 14 is a perspective view enlarged of a cell-case as it comes from the machine; and Fig. 15 is a similar view, but showing the cell-case opened and ready for use.

Like numerals of reference denote like parts throughout the figures of the drawings.

Referring to the drawings by numerals, 1 1 denote the main portions of the frame of the machine, which are each supported by legs 2 2 bolted to the floor and connected and braced together by cross-rods 3 3 3, as shown. In the upper ends of the main portions of the frame are bearings 4 4, in which is journaled the main or driving shaft 5, on one end of which is mounted a driving-pulley 6, having belt connection with suitable power. (Not here shown.) On the other end of said shaft is mounted a fly-wheel 7 operating to steady the motion of the machine.

On each side of the main portions of the frame are bearings 8 8, in which are journaled the shafts 9 9, which carry levers 10 10 for operating the sheet-carriage presently to be described. These levers are each composed of two arms commonly mounted on shaft 9, the upper arm 11 carrying at its upper end a roller 12, which lies within a cam-groove 13 in the inner face of a cam-disk 14 keyed to the driving-shaft. The lower arm 15 of the lever is connected with the carriage, and to permit of the adjustment of the stroke of said carriage the lower end of the upper arm 11 is confined between set-screws 16 16, passed through perforated lugs 17 on the lower arm 15.

The sheet-carriages are shown at 18 18, and each consists of a series of plates 19 19, preferably of steel, and connected together in separated condition by bolts 20 20, blocks 21 21 being employed to maintain their relative distance apart. At opposite corners of said carriage are attached slide-bearings 22 22, which are dovetail in shape and move in slide-boxes 23 23, and are provided with journal-pins 24 24, for connection with the lower end of the actuating-lever. On the plates 19 19 are laid thin steel or other metal plates 25 25, and the latter are secured firmly to said plates 19 by blocks 26 26 and bolts 27 27, passing through said blocks and plates 19, as shown. These blocks 26 are apertured at 28 and serve as bearings for a series of shafts 29 29, which carry the upper plates 30 30. (Shown in detail in Fig. 10.) Between the blocks 26 the shaft is rectangular in cross-section, as shown at $29^a$ in Fig. 6, and the plates are secured to the upper side of said rectangular portion by bolts $29^b$. At the bearings for said shafts in the blocks 26 the shafts are circular in cross-section to permit of their partial revolution, as will be presently described. These upper plates 30 are bent or offset and their free ends contact with the ends of the lower plates for a distance equal to the width of the space-blocks presently to be described. The upper and lower plates are provided with cut-away portions or notches, as shown in Figs. 10 and 11, the shallow notches 31 31 being of sufficient depth to allow of the intersection of the opposing sheets where slotted, and as the paper lies between these upper and lower plates and as the plates have the notches spaced a distance apart equal to the distance between the perforations in the sheets the opposing sheets may enter each other without striking the plates. Between the shallow notches 31 are deeper notches 32 32, which are formed in both of the series of plates, and these notches 32 by their depth expose the sheets for the purpose of allowing the grippers now to be described to operate to prevent the sheets being carried back with the return stroke of the carriage. The grippers are shown at 33, and in detail in Fig. 9. Each gripper consists of a plate 34 secured at one end to a rod 35, which latter is connected by an arm 36 with a rod 37 at right angles to the rod 35 and normally depressed by the action of a coiled spring 38, as shown. By a pin 39 this rod 37 is pivotally connected to a vertical rod 40, which is in turn pivoted at its upper end to one of the arms of a bell-crank lever 41, which has its other arm in the path of a slotted cam-shoe 42, adjustably secured by bolts 43 43 to the outer periphery of the cam-disk 14, a friction-roller 44 being interposed to prevent wear. The rod 40 is vertically adjustable in order to vary the stroke of the grippers by a turnbuckle 45, and 46 is a coil-spring surrounding said rod and interposed between an adjustable collar 47 on said rod and an apertured arm 48. The springs 46 and 38 operate conjointly to normally depress the grippers, the rod 40 being raised against their action. The grippers are each provided at the free end with downwardly-projecting lugs 49 49, having corrugated or serrated faces. These lugs pressing down on the sheets through the deep notches in the upper plates operate with the raised portions 50 50 on the bed-knives to hold said sheets firmly and allow of the free rearward movement of the lower plates with the carriage independent of said sheets. In the lower plates immediately in the rear of the shallow notches are openings 51 51, preferably square in shape, and in the upper plates are formed tongues 52 52, which project below a slight distance. These tongues in operation drop into and engage the triangular openings 53 53 in the sheets and with the movement of these plates the sheets are carried forward positively by the said tongues the exact distance required by the movement of the carriage to which, as before stated, the plates are secured. These tongues, as shown, are triangular in shape and consequently upon the return movement of the plates and carriage the tongues are easily freed from the openings 53 in the sheets, while the latter are firmly held by the grippers at the point to which they have been fed. The upper plates are each normally depressed by the action of a leaf-spring 54, which is passed through the journal and connected at each end to opposite corners of the block, as shown in Fig. 6. By reason of these springs the upper plates bear firmly on the sheets and insure the engagement of the tongues with the openings just referred to. In order to raise these plates for the purpose of removing a sheet or inserting the end of a new roll, I provide hand-levers 55, which are secured to the rectangular portion 29ª of the shaft 29 which carries the plates, and by being depressed easily raise the plates against the action of the leaf-springs.

The space-blocks are shown at 56 56, and are fixedly secured central of the machine. The function of these blocks is to regulate the vertical distance between the sheets, and also their inclination, as will be referred to hereinafter. The space-blocks support the bed-knives 57 57, which, as before stated, carry raised portions 50, which operate in conjunction with the grippers. The two sets of bed-knives are separated a distance equal to the depth of a completed cell-case, and may be adjusted to make a perfect shear with the main knife, presently to be referred to, by drawing bolts 58 58 and set-screws 59 59, which connect the bed-knives with space-blocks. By this adjustment also the wear on the knives may be compensated.

Each side of the machine is provided with a sheet-carriage and a set of space-blocks and bed-knives, and these portions of the machine are arranged at an angle such that the sheets before being assembled will be in their proper position and relation. The portions of the machine referred to on one side have an inclination or are arranged at an angle opposite to the portions of the machine on the other side, the object being, as stated in the early part of the specification, to assemble the adjacent ends of two series of sheets in relatively-inclined positions, to form a cell-case in a collapsed or partially-collapsed condition. The sheets are provided with interlocking tongues and perforations, and consequently can only be put together when in these positions, and the angle or inclination of the sheets enables the strips to be severed therefrom by a shearing action of the main knife, which I will now describe.

60 represents the frame of the knife which carries on each side a blade 61, which may have a straight cutting-edge 62 or an inverted-V-shaped edge, as shown at 63 in Fig. 3ª. These blades shear against the bed-knives, which are steel-faced, and sever the assembled strips cleanly from the ends of the sheets. At the base of the frame and between the edges of the blades is a stripper 64, which strips the completed cell-case from the main knife, and is operated by levers 65 65 at the end of the stroke. These levers are connected with the stripper through rods 66 66, which pass through the frame and are provided with coil-springs which operate to normally raise the stripper. For operating the levers 65 I employ blocks 65ª, which are preferably secured at or near the lower end of the slide-boxes, presently to be described, and which blocks are arranged in the path of the free end of the levers and operate the latter at the end of the stroke of the knife. The knife-frame is provided with slide-bearings, which move in slide-boxes 67 67, arranged in the frame of the machine, and a reciprocating motion is imparted to said knife-frame through the action of a pitman 68, connected at one end to the upper end of the frame and at its other end to the wrist-pin of a crank 69 on the driving-shaft. The pitman is provided with right and left threaded ends, whereby the throw of the knife may be adjusted, and lock-nuts 70 70 are employed to maintain the adjustment.

Referring now to the sheets, a portion of which is shown in Figs. 12 and 13, 71 denotes the sheet from which the longitudinal strips are formed, and 72 the sheet from which the transverse strips are severed. The sheet 71 is provided with slots 73 and 74, the latter communicating with the openings 53 which determine the depth of the cell-case. The sheet 72 is provided with slots 75 and the openings 53, and 76 are cuts which join the slots and openings, and form thereby tongues 77, which, when the cell-case is completed and open for use, engage the slots 73 in the other set of strips. The completed cell-cases are shown in perspective in Figs. 14 and 15 in respectively a partially-collapsed and an open condition.

The operation of the machine is as follows: The sheets after having been properly punched are fed through suitable rolls (indicated diagrammatically in Fig. 1) and are from said rolls supplied to the machine in a slack condition. The ends of the sheets are passed through the carriage and between the plates until they are even with the front edge of the bed-knives. The sheets being in this position the openings 53 oppose each other and the tongues in the upper plates drop into the next row of openings 53. The machine being set in motion, the carriages move toward each other and the sheets fed by the tongues are carried forward and intersect or assemble between the bed-knives, the slots and incisions permitting their interengagement. At this point the grippers fall on the sheets and hold them firmly as the carriage recedes or begins its return stroke. As soon as the ends of the plates pass back into the space-blocks the main knife descends and shears off the strips from the sheets, the stripper forcing the completed cell-case out and permitting it to fall onto a suitable carrier. On the main knife again reaching the upper end of its stroke the carriage is ready to repeat its operation, and so on indefinitely until the rolls are exhausted and new rolls replaced.

What I claim as my invention, and desire to secure by Letters Patent, is—

1. In a cell case machine, intermittently operated carriages arranged to feed two series of continuous previously perforated sheets in relatively inclined positions, interposed guides which receive said sheets from the carriages and between which said sheets are assembled to form a cell case in a collapsed or partially collapsed condition, means for retaining the sheets during the backward movement of the carriage, and means for severing the assembled ends of said sheets.

2. In a cell case machine, intermittently operated carriages for feeding two series of continuous previously perforated sheets in relatively inclined positions and provided with plates by which said sheets are engaged and moved forward, interposed guides which receive the sheets from the plates and through which the sheets pass in a separated condition, and between which said sheets are assembled, and grippers operating to retain the sheets during the backward movement of the plates and carriage.

3. In a cell case machine, intermittently operated carriages for feeding two series of continuous previously perforated sheets in relatively inclined positions, a series of plates on the carriages adapted to engage the perforations in the sheets to insure the movement of the latter with the carriage, interposed guide blocks which receive the sheets from the plates and through which the sheets pass in a separated condition, and between which the ends of said sheets are assembled to form a cell case in a collapsed or partially collapsed condition, and grippers adapted to be depressed to retain the sheets during the backward movement of the plates and carriage.

4. In a cell case machine, intermittently operated carriages for feeding two series of continuous previously perforated sheets in relatively inclined positions, each of said carriages provided with a series of upper and lower plates between each set of which a sheet passes, tongues on the upper plates adapted to engage the perforations in said sheets during the forward movement of the carriage, interposed guides which receive the sheets from the plates and through which the sheets pass in a separated condition, and between which the ends thereof are assembled to form a cell case in a collapsed or partially collapsed condition, the bed knives, and the grippers adapted to be depressed to retain said sheets during the backward movement of the plates and carriage.

5. In a cell case machine, an intermittently operated carriage adapted to feed perforated sheets in a separated condition, upper and lower plates carried thereby and between which the sheets pass, tongues on the upper plates for engaging the perforations in the sheets during the forward movement of the carriage, guide blocks to maintain the separated condition of the sheets and insure their proper position, bed knives having raised portions over which the sheets pass, and grippers operating in conjunction with such raised portions to hold the sheets during the backward movement of the carriage.

6. In a cell case machine, an intermittently operated carriage adapted to feed previously perforated sheets in a separated condition and provided with a series of upper and lower plates between each set of which a sheet passes, the upper plates having projections for engaging the perforations in the sheets, springs operating to depress said upper plates, and hand levers for raising said plates against the action of the springs.

7. In a cell case machine, intermittently operated carriages for feeding two series of continuous previously perforated sheets in relatively inclined positions, each of said carriages provided with series of upper and lower plates between each set of which a sheet passes, tongues on the upper plates adapted to engage the perforations in said sheets during the forward movement of the carriage, interposed guides which receive the sheets separately from the plates and between which the ends thereof are assembled to form a cell case in a collapsed or partially collapsed condition, the bed knives provided with raised portions over which the sheets pass, and the grippers pivotally mounted and having serrated ends adapted to be depressed and to operate with said raised portions to retain the sheets during the backward movement of the carriage.

8. In a cell case machine, the combination of the guide blocks, the bed knives adjustably connected thereto by means of drawing bolts and set screws, said knives having on their upper side raised portions over which the sheets pass, the feeding grippers comprising the lower plates slotted to receive said raised portions, and the upper plates spring depressed and provided with tongues for engaging perforations in the sheets, and the grippers 33 having their engaging ends serrated and in alignment with said raised portions, all substantially as and for the purposes set forth.

9. In a cell case machine, the combination of the adjustable bed knives carrying raised portions over which the sheets pass, the feeding grippers comprising the lower plates slotted to receive said raised portions and movable over said knives, and the upper plates having means for engaging the sheets, the spring depressed grippers 33 having their engaging ends in alignment with said raised portions, and means for raising said grippers intermittently against the action of the springs.

10. In a cell case machine and in combination with an intermittently operated sheet carriage at each side of the machine, of a series of upper and lower plates for each carriage, provided with notches in their free ends for the purposes set forth.

11. In a cell case machine, the combination of the adjustable bed knives carrying raised portions over which the sheets pass, the spring depressed grippers each of which is provided with an engaging serrated end in alignment with a raised portion, and means for intermittently raising said grippers against the action of the spring consisting of a rod adjustable in length and connected to one end of a bell crank lever, and a cam shoe adjustably secured to a disk and arranged to move in the path of the other end of said lever.

12. In a cell case machine, the combination of two sets of bed knives between which the ends of two series of sheets are assembled, the guide blocks, the carriages provided with devices for engaging the sheets in their forward movement and means for actuating said carriages intermittently consisting of levers each formed of two arms commonly pivoted, the upper arm having an extension interposed between two set-screws on the lower arm, and a cam disk engaging the upper arm.

13. In a cell case machine, the combination of two sets of bed knives between the ends of which two series of sheets are assembled to form a cell case in a collapsed or partially collapsed condition, said knives having inclined passages for the sheets, the main knife provided with two blades, one for each bed knife, to sever the assembled ends of the sheets, means for adjusting the throw of the main knife, a stripper between the two blades normally raised by the action of springs, levers pivoted to the main knife and having rod connection at one end with the stripper and projections located in the path of the free ends of the levers.

In testimony whereof I affix my signature in presence of two witnesses.

HOWARD F. SMITH.

Witnesses:
  ALICE CRULL,
  C. D. CASE.